May 12, 1964
M. WALLSHEIN
3,132,425
FITTING ADAPTED FOR ORTHODONTIA
AND OTHER DENTAL PRACTICES
Filed March 10, 1961
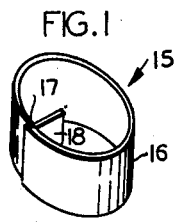
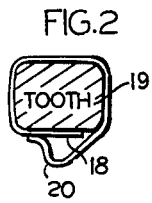
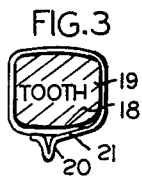
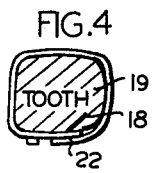
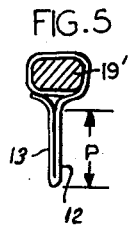
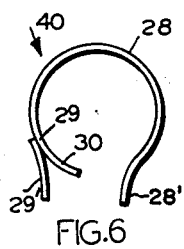
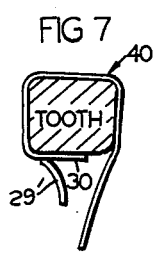
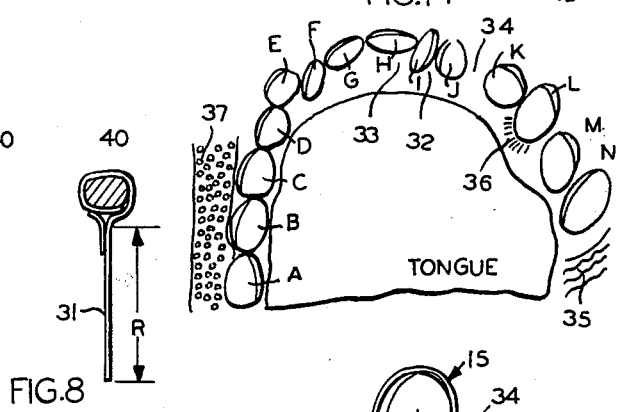
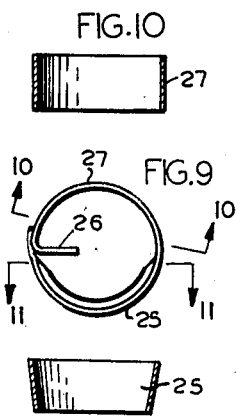
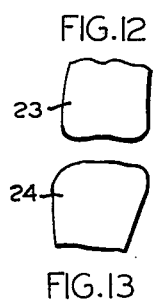
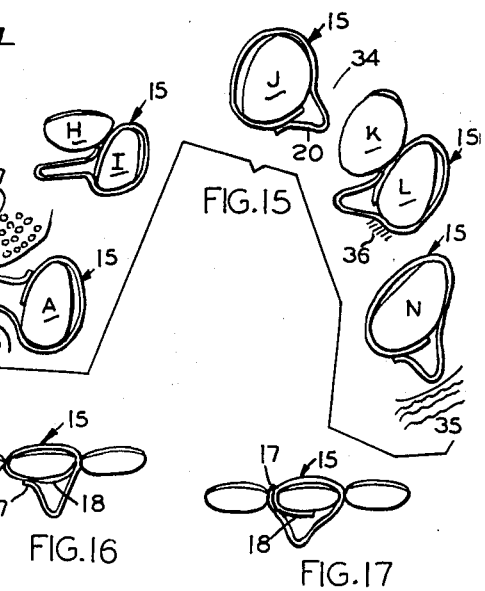
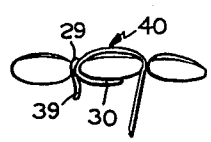
INVENTOR,
MELVIN WALLSHEIN,
BY
ATTORNEY.

United States Patent Office 3,132,425
Patented May 12, 1964

3,132,425
FITTING ADAPTED FOR ORTHODONTIA AND OTHER DENTAL PRACTICES
Melvin Wallshein, 8645 Bay Parkway, Brooklyn, N.Y.
Filed Mar. 10, 1961, Ser. No. 94,775
5 Claims. (Cl. 32—14)

The present invention relates to fittings used in orthodontia and adaptable for other dental practices and more particularly to a band which is fitted tightly about a tooth and made to carry a bracket suitable to support an arch wire. Since such bracket is no part of this invention, it is omitted in this disclosure.

This application is a continuation-in-part of my application bearing Serial No. 842,496, filed on September 25, 1959, which is now abandoned.

Heretofore, a band of this class was usually made of a short piece of extremely thin-walled metal tubing of a diameter rather large in relation to the tooth to be encircled, such metal being non-springy so that it will remain in any form it is bent to. This piece of tubing was bent to form an open ring of somewhat larger diameter than the tooth it was to serve and the remainder of said tubular piece was flattened to give a sort of handle to said open ring. So bent, the article had the shape somewhat of a key-hole. The ring portion was forced onto a tooth to encircle it and then with a proper plier tool, the handle portion was lengthened, thereby decreasing the ring diameter to tightly fit the encircled tooth. The article was then removed from the tooth, the diameter of the resulting ring part was increased a bit to receive a small tab of equally thin material therein overlapping the ring's end zones and then the tab was welded to said zones to seam the ring. The "handle" was trimmed off, yielding the now closed ring, which after having a suitable arch-supporting bracket mounted on the outer surface in proper position, was reset on the tooth ready to receive the arch wire for support in said bracket. Various dental practices do not require the bracket.

One of the principal objects of this invention is to provide a novel and improved article of manufacture of the character described, which is manipulated to bring the ring to proper size, but instead of the separate tab heretofore used, I provide an integral part of the initial structure all of which I make of a single piece of metal strip and provide that the resulting fitted ring shall be more than one turn, thereby having an overlap in the ring structure for the welding operation to seam the preformed ring. There are no separate pieces to be welded and the size of the ring formed is true.

My intention is to have a single article to be adjustable for use with practically every size of tooth so that the dentist need stock only one size of band item. Of greater importance is that in fitting the band to the tooth, the "handle" portion should not become unduly long when the work is on a small tooth.

In a two-piece band, which I have included in the drawing to aid in explaining the advantages of my present invention, the "handle" is of two parts, one of which is of a fixed length, but at times became inaccessible for manipulation by tool means to make adjustments to tooth size.

It is therefore another important object of this invention to provide a novel and improved band item of the class set forth, which is adjustable for use on any tooth, having a provision for access to the "handle" portion for manipulation in tight situations, such as crowded teeth, turned teeth adjacent extraction areas and where the gum is high and which has a minimum of handle length when adjusted and set on the smaller teeth, and which avoids undue interference with tongue, cheek and lips.

A further object of my one-piece band which is the subject of this invention, is that it provides easier fabrication, facilitates working therewith, avoids crossed handle parts in the mouth in awkward positions as is incident with the use of the two-piece band, avoids cutting and requires a minimum of material.

Another object of this invention is to provide a novel and improved band structure of the kind set forth having proper contours for universal use, also to present contours so that the tab in conjunction with part of the band is suitable for band structure about upper teeth the usual form of which are straight sided and the tab in conjunction with the other part of the item is suitable for band structure about lower teeth the usual form of which are convergent sided, as will be shown.

A further object of this invention is to provide a novel and improved article of manufacture of the character mentioned which is simple in construction, easy to manipulate, automatic in effecting the required overlap, reasonably cheap to manufacture and efficient in carrying out the purposes for which it is designed.

Other objects and advantages will become apparent as this disclosure proceeds.

For the practice of this invention, one form the fitting may assume is as follows: A piece of metal strip, preferably gold, is bent to form a ring, one end of said strip being then welded to the outer surface of said ring a distance away from its other end, whereby a tab is provided interior of the tubular form the strip has been made into. This tab is preferably set in a radial direction. In use, this ring is set about a tooth with a surface of said tab against said tooth and that part of the ring which is farthest from the tooth is drawn to form a tail for the band forming directly about the tooth, and such tail is so manipulated that the band formed shall overlap the tab so that the band tightly fitting the tooth is one and a fraction turns. In the setting of the tab against the tooth, any surface of the tab may be used.

As a modified embodiment, I provide the ring with its inwardly extending tab made of one piece as mentioned and then form half of said ring which is to one side of the tab commencing at the tab's juncture into frusto-conical shape, the other half remaining cylindrical or straight column form. The frusto-conical part in conjunction with one surface of the tab are the portions used when a band is to be tightly formed about a lower tooth, while the other part, meaning the straight part of the ring in conjunction with the other surface of the tab are the portions used when a band is to be tightly formed on an upper tooth.

In the accompanying drawing forming part of this specification, similar characters of reference indicate corresponding parts in all the views.

FIG. 1 is an enlarged perspective view of the fitting adapted for use in orthodontia and constructed in accordance with the teachings of this invention.

FIG. 2 shows the fitting set about a tooth, ready to be drawn tightly to form a band which will overlap the tab component. Here the tooth is of large size FIG. 3 is like FIG. 2, but shows the ring tightly fitted on the tooth by flattening the excess which I have called the "handle" portion of the item. The formed article is now ready to be removed for the welding operation to seal the ring closed.

FIG. 4 is a similar view showing the finished trimmed-off ring mounted on the tooth.

FIG. 5 is a view similar to FIG. 2, but here the band or ring is formed tightly on a small tooth, thereby creating a longer handle.

FIGS. 6, 7 and 8 are akin to the FIGS. 1, 2 and 5 respectively, but here the item is the two-piece construction which I first developed before the final preferred form exemplified in FIG. 1.

FIG. 9 is a top plan view of a modified construction.

FIGS. 10 and 11 are sections taken at the lines 10—10 and 11—11 respectively, in FIG. 9.

FIGS. 12 and 13 are fragmentary elevational views of an upper and a lower tooth respectively.

FIG. 14 is a top plan view of the lower teeth of a mouth presenting conditions calling for orthodontic treatment.

FIG. 15 is an enlarged view of several of the teeth shown in FIG 14 in association as they occur, fitted with bands of the type shown in either FIGS. 1 or 10.

FIG. 16 shows a band in the process of being fitted onto a tooth, where such band will need be shifted to accomplish proper fit.

FIG. 17, like FIG. 16, shows the band shifted and yet the "handle" portion is accessible to finish the manipulation to accomplish proper fit.

FIGS. 18 and 19 are akin to the FIGS. 16 and 17 respectively, but here the two-piece band is used. In FIG. 19, the accessible part of one of the tail portions is so short that it has become impossible to complete fitting of the band.

All views are drawn to an enlarged scale, except FIG. 14 which is about normal size.

In the drawing, the numeral 15 designates generally a preferred form of this invention as an article of manufacture to be used in dental practices. It is made of a bendable paper-thin metal strip, preferably of gold. The strip is formed into a ring 16 with ends overlapping. The outside end of the strip is welded at 17 or otherwise suitably secured to the outer surface of the ring thereby providing the tab 18 interior of the tubular form the strip has been made into. The tab is preferably bent radially inwardly. The diameter of the ring 16 is larger than that of the tooth 19 which is to carry it, so that for the largest tooth, there would still be sufficient though a minimum of handle portion 20 for manipulation by a suitable plier tool to draw the ring tightly onto the tooth as shown in FIG. 3 where the tab is against the tooth surface and overlaps the band formed as indicated at 21. The item is now removed from the tooth, welded at 22 and the "handle" portion trimmed off as shown in FIG. 4 where the finished band is shown reset on the tooth. It is evident that when the band is applied to a smaller tooth, the handle portion will be longer. If the tooth 19 is the largest tooth, then in proportion, tooth 19' is meant to represent the smallest tooth. For use in orthodontia, before the band is reset as in FIG. 4, it may be provided with an arch-supporting bracket which is not shown, but well known to those versed in the art. Since upper teeth are substantially straight-walled as 23 and lower teeth are convergent-walled as 24, the ring wall portion as appears in FIG. 10, which is aside one face of the tab 26, may be straight so that such band portion is cylindrical or the like in the article as purchased, as at 27, and the ring wall portion aside the other face of the tab 26 is frusto-conical as at 25.

In an earlier attempt to provide a band with an overlapping tab so as to have a unitary structure, I devised the one shown in FIG. 6 which is of two parts made of strip material. Part 28 is an open ring to which at a region away from one end thereof, a short piece 29' was welded at 29 to provide the tab 30, said piece 29' and the other end portion 28' of the ring, serving as the handle components. I found however that the resulting handle length when used on small teeth became unduly long as shown at 31, and when used on most teeth was still too long to be useable or practical in various teeth formations and anatomical mouth structures as for instance in crowded and turned tooth formations as existing at regions 32 and 33 in FIG. 14, or at regions where the handle need set and be manipulated in extraction areas as at 34, or adjacent bone 35, high gums as diagrammatically indicated at region 36 or at muscle fibre at cheek regions as 37. Where the band 40 had to be shifted to accommodate the tab 30 because otherwise such tab would be stuck at contact region of contacting teeth, that is, from the position shown in FIG. 18 to that of FIG. 19, the handle portion offered by the piece 29' became extremely short as shown at 39 whereby the mounting of the band became impossible because of the inability to grip the extremely short piece at 39 with a pliers. These are given as mere examples to show the impracticability or in some instances the impossibility to use the two-piece item shown in FIGS. 6-8 and 18,19.

With the band as constructed in FIG. 1 and its modified form shown in FIG. 9, all of the mentioned disadvantages are obviated and it is practical for use universally at any mouth condition, always offering a sufficient handle, not to large and never too small.

Preparatory to placing the band 15 about a tooth, holding in mind that a surface of the tab 18 is to set against the tooth, the band is taken in hand by the dentist and bent to form a ring including said tab as part of its circumference so that the diameter of such formed ring is a bit more than is required to encircle the tooth to be worked on. To do this, the band is flattened to oval shape with the tab along a minor axis. For a large tooth 19, the band is bent to shift most of it to lie opposite the plane of one tab face. This is an enlargement afforded by using the material of the band opposite the other tab face to shift up to position where it is opposite said plane. That is, the ring to be formed gets its material it still needs to come up to the required size, from that band portion which is to constitute the handle portion of the fitting; the material of the left handle leg portion feeds to become part of the right handle leg portion which in turn feeds material into the ring shape being formed to encircle the tooth. But being that both legs of the handle portion are of one strip, said legs will ultimately be of the same length as shown at 20 in FIG. 3. If the fitting 40 were used, its leg 29' remains constant in length and the leg portion of the circle 28 would shorten. For use on a small tooth 19', the smaller section of the deformed band 15 is for the ring which is to encircle the tooth and the remainder formed into handle portions would be of equal length as shown in FIG. 5, or the larger portion may be used and the material from the ring would be fed therefrom into the right leg handle portion 12 and thence into the left leg handle portion 13 to attain the structure shown in FIG. 5. If the fitting 40 were used for a small tooth (such fitting being useable for all sizes of teeth), then the fitting would have the extra long handle portion R. By using the fitting 15, the handle length would be half as shown at P. Said extra long tail 31 makes the fitting 40 impractical, would hurt the patient and its use would be prohibitive in such mouth conditions as within an extraction area 34, against bone 35 or muscle structure 37 or where it would interfere with the tongue at tooth L or at high gum regions as 36. It should also be noted that by use of the fitting 15, either face of the tab may be against a tooth. The dentist does not have to pick any particular part of the fitting for he can choose to have either tab face against the tooth. Also to be noted is that with the fitting 15, the juncture of the strip ends may be at any position on a tooth, because regardless where region 17 is on a tooth, there is always sufficient handle portion accessible for manipulation. This is not true of the band 40.

Although I have shown my new fittings circular in form as the simplest way to present them for marketing, the ring may be preformed a bit to define a start of the handle formation or be prepared for sale to dentists in the form shown in FIG. 2, or have the tab 18 in acute angle relation to the ring wall. If my item is presented for sale as in the form shown in FIG. 2, it is evident that it can be used for the large tooth 19, or the small tooth 19'. Although it is my intention that my fitting shall be for any tooth so that the dentist need stock only one size, it may be made in different sizes if desired, so long that essentially the item is of one piece of strip material bent into a tubular form, one end of which strip is secured to the outer surface of the tube at a distance away from the other strip end to form an inside tab.

This invention is capable of numerous forms and various applications without departing from the essential features herein disclosed. It is therefore intended and desired that the embodiments herein shown in FIGS. 1 and 9 shall be deemed merely illustrative and not restrictive and that the patent shall cover all patentable novelty herein set forth; reference being had to the following claims rather than to the specific description herein to indicate the scope of this invention.

I claim:

1. A dental fitting of the character described, made of a single piece of bendable strip material formed into a tubular form, one end portion of the strip being inside and the other end portion being outside said tubular form, said outside end portion, substantially at its terminating edge being joined to the outer surface of the tubular form at a predetermined distance from the inside end of the strip whereby a tab is formed inside the tubular form, said tubular form being adapted to fit loosely about a tooth in a mouth when set onto said tooth with a face of said tab against said tooth whereby a portion of said tubular form extends away from said tooth whereupon closing such portion by flattening it, a tightly fitted ring will be formed about said tooth and said tab will be within said ring and overlap therein.

2. A dental fitting as defined in claim 1, wherein said tab lies in a direction across the plane of said tubular form.

3. A dental fitting of the character described, made of a single piece of bendable strip material formed into a tubular form, one end of the strip being inside and the other end being outside said tubular form, said outside end being joined to the outer surface of the tubular form at a predetermined distance from the inside end of the strip whereby a tab is formed inside the tubular form, said tubular form being adapted to fit loosely about a tooth in a mouth when set onto a tooth with a face of said tab against the tooth whereby a portion of said tubular form extends away from said tooth whereupon closing said portion by flattening it, a tightly fitted ring will be formed about the tooth and at least a portion of said tab will be within said ring and overlap therein; substantially half of said tubular form commencing from the juncture of the tab being parallel to the direction of the length of said tube and the remainder of said tubular form being inclined to such direction whereby the first mentioned half is of a cylinder and the other half of a frusto-cone.

4. A dental fitting as defined in claim 3, wherein said tab lies in a direction across said tubular form.

5. A dental fitting of the character described, made of a single piece of bendable strip material formed into a tubular form, one end of the strip being inside and the other end being outside said tubular form, said outside end being joined to the outer surface of the tubular form at a predetermined distance from the inside end of the strip whereby a tab is formed inside the tubular form, said tubular form being adapted to fit loosely about a tooth in a mouth when set onto a tooth with a face of said tab against the tooth whereby a portion of said tubular form extends away from said tooth whereupon closing said portion by flattening it, a tightly fitted ring will be formed about the tooth and at least a portion of said tab will be within said ring and overlap therein; the tab extending in a direction across said tubular form; the longitudinal part of said tube which is to one side of the plane of said tab being of greater width than the other longitudinal part of said tube which is to the other side of said plane.

References Cited in the file of this patent

UNITED STATES PATENTS 1,173,998    Depew ---------------- Feb. 29, 1916